United States Patent Office 2,888,611
Patented May 26, 1959

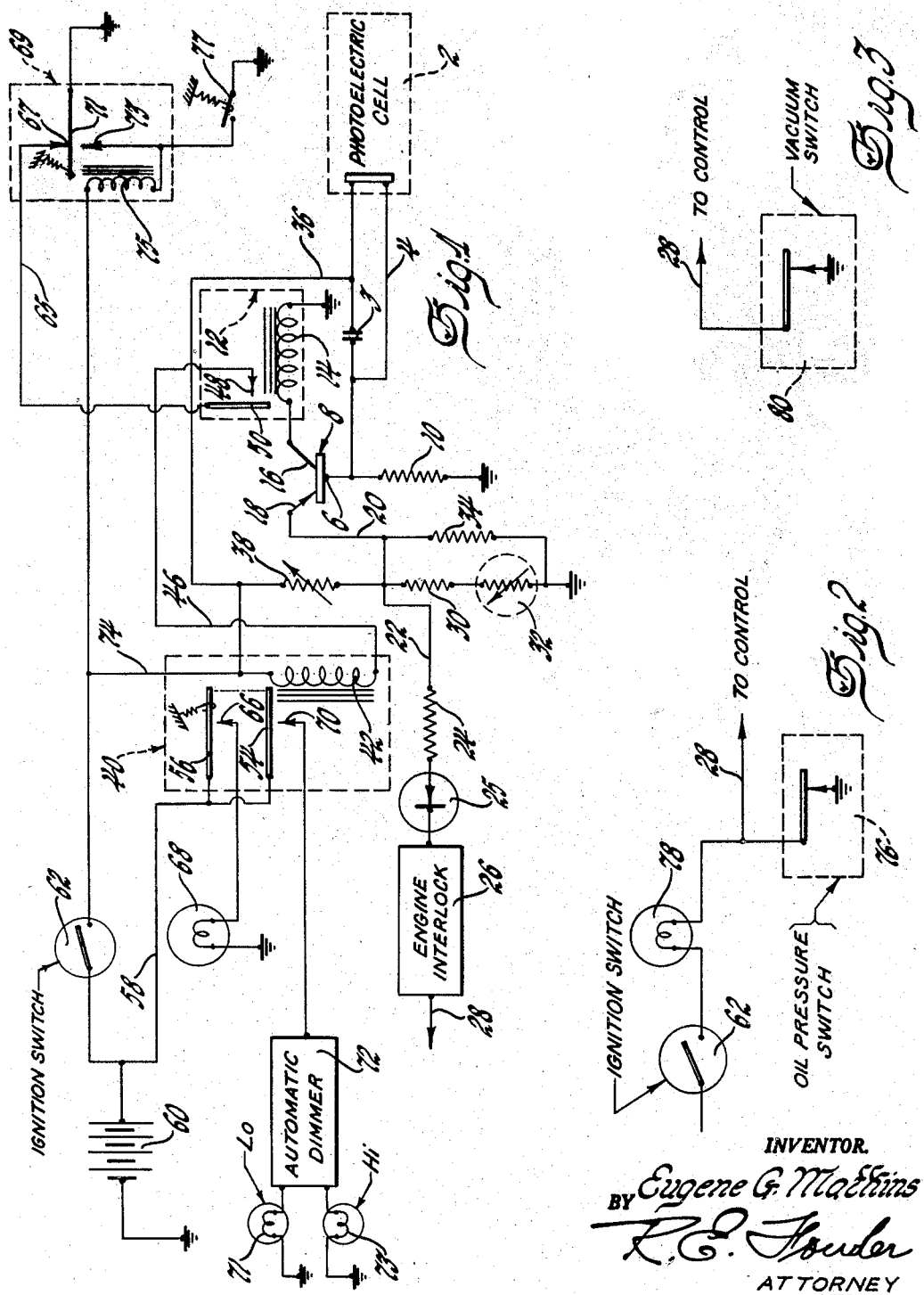

2,888,611

LIGHT CONTROLLED HEADLIGHT ON-OFF SWITCH

Eugene G. Matkins, Anderson, Ind., assignor to General Motors Corporation, Detroit, Mich., a corporation of Delaware Application September 13, 1957, Serial No. 683,835

5 Claims. (Cl. 315—82)

This invention relates to light sensitive switching means and more particularly to a light sensitive control switching means for automatically turning on and off the headlamps of a motor vehicle depending upon ambient light conditions. There are many instances in which it would be of considerable assistance to the driver of an automotive vehicle to have the lights automatically turned on and off when the ambient light conditions vary beyond prescribed limits. For example, if a car is being operated on a turnpike in daylight and enters a tunnel, the driver frequently finds himself in a darkened area before he realizes that he should turn on his headlights light. As a matter of fact, many highway departments have found it necessary to establish large signs at the entrance to tunnels warning the drivers to turn on their headlights. Procedure into darkened buildings is also another hazard and of course frequently headlights are not energized early enough in the evening when they should be. It would considerably relieve the driver's mind if automatic means could be provided to turn on the lights when needed and to turn them off when the surrounding light level reaches a certain point.

Light sensitive automatic dimming means have been provided to cause the multi-filament car lights to switch from high beam to low beam upon the approach of a vehicle from the opposite direction and to return to high beam after the vehicle has passed. If the current control circuit were to be combined with the automatic dimming system, then the operation of the lighting equipment of the vehicle would be wholly automatic.

It is therefore an object in making my invention to provide a light sensitive control means for automatically turning on the lights of a vehicle when the ambient light level falls below a certain point and to automatically turn them off again if the light level exceeds that point.

It is a further object in making this invention to provide a light sensitive control means for switching lights which draws a minimum amount of power from the source.

It is a still further object in making this invention to provide a light sensitive transistor circuit for controlling lights of an automotive vehicle. It is a still further object in making this invention to provide a light controlled system for turning vehicle lamps on and off which can be combined with automatic light controlled dimming means for complete automatic control of a vehicle lighting system.

With these and other objects in view which will become apparent as the specification proceeds, my invention will be best understood by reference to the following specification and claims and the illustrations in the accompanying drawing in which:

Figure 1 is a circuit diagram of a light sensitive control system of my invention.

Figure 2 is a partial circuit diagram illustrating interlocking control means with other portions of the vehicle's system; and Figure 3 is a still further circuit diagram of another type of interlock to cause the circuit energization at the proper time in the operation of the vehicle.

Referring now more particularly to Figure 1, there is shown therein a photoelectric cell 2 which may be located at any point in the vehicle and subject only to the ambient light conditions surrounding the vehicle. Preferably this cell is subject to light from the sky and is mounted to face upwardly. The photocell is of the photoemissive type although it could be of a variable resistor type. One terminal of the photocell is connected through line 4 to the base terminal 6 of a transistor 8. The base terminal 6 is connected through biasing resistance 10 to ground. A sensitive relay 12 is adapted to be controlled by the photocell and the relay coil 14 has one terminal grounded and the other connected to the collector electrode 16 of the transistor. The emitter electrode 18 of the transistor is connected to the source of power by line 20. Tie line 22 also connects line 20 through limiting resistor 24 and a rectifier 25, to an engine interlock section 26 and line 28 which interlocking section will be further described. The rectifier is used to prevent feedback from the interlock.

Biasing resistance 30 in series with a thermistor 32 is connected between line 20 and ground to provide emitter bias. A further biasing resistance 34 is connected between line 20 and ground in shunt to the two previously mentioned resistances 30 and 32. The remaining terminal of the photocell 2 is connected through line 36 to one terminal of a variable resistor 38 and thence to line 20 and directly through line 74 to the ignition switch and to the source of power 60 by which power is applied to the photocell. The operation of the sensitive relay 12 controls a power relay 40. The power relay has an operating coil 42, one terminal of which is connected directly to power input line 74 and the other terminal of which is connected through line 46 with stationary contact 48 of the sensitive relay 12. A movable armature 50 of the sensitive relay 12 is connected through line 65 to stationary contact 67 of the automatic resetting relay 69. The relay 69 has a movable armature 71 that is grounded and which oscillates between stationary contact 67 and a spaced stationary contact 73. The main ignition switch of the car 62 is connected between the battery 60 and one terminal of the coil 75 of the relay 69. The opposite terminal of the coil 75 is directly connected to stationary contact 73 to provide a holding circuit for the coil and also to ground through a spring biased open switch 77 to initially energize the relay 69 as will be described.

The operating coil 42 of the power relay 40 actuates two armatures 54 and 56 which are commonly connected through line 58 to one terminal of the battery 60 of the vehicle. The other terminal of the battery is grounded. Switch 77 is provided in order to cut off the light sensitive control circuit completely and return the headlamps to manual switch operation. Armature 56 of the power relay 40 cooperates with stationary contact 66 which is connected through any tail lamp circuit illustrated by tail lamp 68 to ground. In like manner, armature 54 of the power relay 40 cooperates with stationary contact 70 which is connected to any headlamp circuit which in this case is indicated as being controlled by an automatic dimmer circuit 72 and closure of this switch therefore energizes either the low beam filaments 71 or the high beam filaments 73 of the headlamps, depending upon incident light from approaching vehicles.

In the operation of this system, when the ignition switch is closed, power is supplied through line 74, line 36 through the photocell 2, line 4 and resistance 10 to ground. This circuit determines the base bias on the transistor 8 and the voltage applied to the emitter can be adjusted by adjusting resistance 38 so that enough current will flow through the sensitive relay coil 14 to cause it to attract its armature 50 when a certain light level exists. As long as switch 48—50 stays open, the power relay will not be energized and the lights deenergized. This therefore would be during daylight hours. Assume also, that while the ignition switch has been closed, the engine has not as yet begun to operate and therefore the engine interlock circuit is grounded reducing the emitter voltage. This interlock circuit may take the form of that shown in Figure 2 wherein an oil pressure switch 76 is shown which is closed when no oil pressure is present in the line but opens when the engine develops oil pressure. This prevents the proper bias developing on the emitter until the engine starts. This switch is connected to ground and to the control line 28. It is also connected through an indicating light 78 to the ignition switch 62. The light indicates that the oil pressure has not yet built up and goes out when the engine starts. In the event that the car is not equipped with an oil pressure switch and indicating light such as 78 to indicate no pressure, a vacuum operated switch 80 such as shown in Figure 3 may be used, which switch is normally closed when no vacuum is present but which opens upon the establishment of vacuum in the fuel supply system. This switch may be connected directly to control line 28. The operation of the interlock is the same.

Assume now, that the vehicle is to be started in an enclosure where the light level is low and therefore would normally require the headlights to be energized. The ignition switch is turned on but the engine has not as yet started. At this juncture the cell 2 has a very high resistance and under these conditions the transistor base 6 would be normally biased negative to the emitter. However, at this time, the engine interlock resistor 24 is grounded. This reduces the emitter voltage lower than it would normally be. Under these conditions the base is less negative with respect to the emitter, collector current is cut off and the sensitive relay switch 48—50 is open. As previously described, the power relay is also deenergized and the headlamps and the tail lamps are cut off. If the engine is now started, the ground is removed from the interlock circuit due to the opening of switch 76 upon the establishment of oil pressure. The base may now become negative with respect to the emitter 18 and if the ambient light is sufficiently low, will permit current to flow in the collector circuit to energize the sensitive relay 12. Upon the closure of switch 48—50, the power relay 40 will be energized, moving both armatures 56 and 54 into contact with their associated stationary contacts and completing the headlight and tail light circuits. The reason for having the headlights and tail lights switched through separate circuits is so that the parking lights can be independently energized manually.

If the vehicle is then operated into an area in which the light level increases beyond a predetermined amount, light strikes the photoelectric cell and current is generated thereby. The current flow in the photocell circuit drives the base bias in the positive direction cutting down the flow of current through the emitter and collector circuit and at some critical value will cause the sensitive relay 12 to drop its armature 50 opening the energizing circuit for the power relay coil 42 which in turn will cause the lighting circuits to be broken and the lights will be turned off. It may be also mentioned that the cell's internal resistance changes upon light falling thereon and inasmuch as it forms a part of a potentiometer between the power line and ground, the variation in cell resistance will cause more current to flow, which aids in cutting off the collector current and switching off the headlamps.

If the car was started in a lighted area instead of a dark area, the operation through the engine interlock switch maintains the headlights off until the engine starts and, of course, once the engine is started the headlights are not turned on since the photocell circuit holds the current flow in the transistor below the sensitive relay energizing value. The car may then be operated and the headlamps will turn on when the light falls below a predetermined point and be turned off again when the light level exceeds that value. The point of operation will be determined by the setting of the variable resistance 38 and as this is changed, the light level for switching operation can be adjusted at the operator's desire. This is the sensitivity control. It adjusts the operating bias on the base of the transistor. The condenser 3 across the photoelectric cell 2 provides a time delay in the operation of the switch 48—50.

In the above described operation it has been assumed that the relay 69 remained deenergized with its armature 71 in the position shown grounding line 65. If, however, at any time the driver wishes to cut out the automatic system he merely momentarily closes spring biased switch 77. This completes an energizing circuit for coil 75 as follows: from battery 60, through ignition switch 62, coil 75 and switch 77 to ground. Armature 71 is then attracted to engage lower contact 73 closing an obvious holding circuit for coil 75 so that switch 77 may be released but the resetting relay will remain energized. This keeps the grounding circuit for relay coil 42 open and the automatic system is inactive. If the ignition switch is cut off, the system is returned to its original condition.

The voltage regulation of the circuit is provided by having the base-emitter bias change in a direction to counteract increases in emitter voltage. This is accomplished through the network including biasing resistances 30 and 32 in one leg and shunting resistance 34 therefor. The thermistor 32 connected in series with biasing resistance 30 has a negative temperature coefficient of resistance. Thus when the temperature increases, the resistance of thermistor 32 decreases which automatically causes the emitter voltage to decrease. This in turn reduces the negative base-emitter bias and acts in the opposite direction to the rising collector current caused by ambient temperature increase in the transistor. This maintains a relatively constant collector current from a low temperature to a high one. As the temperature decreases, the opposite effect of course occurs. The thermistor resistance increases, increasing the base-emitter bias to provide more collector current.

In this circuit, if an automatic headlight dimmer is connected between the control and the headlamps, the operation of the lighting equipment of the car will be entirely automatic. The driver merely starts the car and drives it and the lights are turned on and off and automatically dimmed during normal operation of the vehicle.

I claim:

1. A control system for energizing or deenergizing the headlamps of an automotive vehicle when the ambient light intensity is less or greater than a predetermined value, a light responsive circuit including a photoelectric device, said circuit being adapted to develop a signal voltage corresponding to ambient light intensity, an amplifier having an input circuit and an output circuit, said light responsive circuit being connected with said input circuit for controlling the current in the output circuit, a relay including a switch and connected in the output circuit for energization thereby to actuate said switch at a predetermined value of current in the output circuit, a headlamp circuit including a voltage source connected through said switch, means for applying operating voltages to said amplifier to permit the current in the output circuit to attain said predetermined value when the signal voltage corresponds to an ambient light intensity less than said predetermined value and disabling means connected with said amplifier and being operative until the engine of the vehicle is started to prevent the output current from attaining said predetermined value.

2. A control system for energizing or deenergizing the headlamps of an automotive vehicle when the ambient light intensity is less or greater than a predetermined value, a light responsive circuit including a photoelectric device, said circuit being adapted to develop a signal voltage corresponding to ambient light intensity, an amplifier having an input circuit and an output circuit, said light responsive circuit being connected with said input circuit for controlling the current in the output circuit, a relay including a switch and connected in the output circuit for energization thereby to actuate said switch at a predetermined value of current in the output circuit, a headlamp circuit including a voltage source connected through said switch, a bias circuit connected with said input circuit for developing a bias voltage therein which permits the current in the output circuit to attain said predetermined value when the signal voltage corresponds to an ambient light intensity less than said predetermined value and circuit means connected with said bias circuit and being operative until the engine of the vehicle is started to change the bias voltage and prevent the output current from attaining said predetermined value.

3. A control system for energizing or deenergizing the headlamps of an automotive vehicle when the ambient light intensity is less or greater than a predetermined value, a light responsive circuit including a photoelectric device, said circuit being adapted to develop a signal voltage corresponding to ambient light intensity, a transistor amplifier having an input circuit extending between first and second transistor electrodes and an output circuit extending between a third and said second transistor electrodes, said light responsive circuit being connected with said input circuit for controlling the current in the output circuit, a relay including a switch and connected in the output circuit for energization thereby to actuate said switch at a predetermined value of current in the output circuit, a headlamp circuit including a voltage source connected through said switch, a bias circuit connected in said input circuit and across said voltage source for developing a bias voltage which prevents the current in the output circuit from attaining said predetermined value even though the signal voltage corresponds to an ambient light intensity less than said predetermined value, and an engine interlock circuit connected across the bias circuit and including an engine condition responsive switch actuated by engine starting to change the bias voltage and permit the output current to attain said predetermined value and energize said headlamps.

4. A control system for energizing or deenergizing the headlamps of an automotive vehicle when the ambient light intensity is less or greater than a predetermined value, a voltage source, a transistor amplifier, a resistor connected between the transistor base and ground, a photoelectric cell connected in series with the resistor and said voltage source, a relay including a switch and connected between the transistor collector and ground for energization thereby to actuate said switch at a predetermined value of collector current, a headlamp circuit including the voltage source connected through said switch, a bias circuit connected between the transistor emitter and ground and across said voltage source for developing a bias voltage therein which permits the collector current to attain said predetermined value when the ambient light intensity is less than said predetermined value and circuit means connected with said bias circuit and operative until the engine of the vehicle is started to change the bias voltage and prevent the collector current from attaining said predetermined value.

5. A control system for energizing or deenergizing the headlamps of an automotive vehicle when the ambient light intensity is less or greater than a predetermined value, a voltage source, a transistor amplifier, a resistor connected between the transistor base and ground, a photoelectric cell connected in series with the resistor and said voltage source, a relay including a switch and connected between the transistor collector and ground in the output circuit for energization thereby to actuate said switch at a predetermined value of collector current, a headlamp circuit including the voltage source connected through said switch, a resistance network including a thermistor connected between the transistor emitter and ground, a variable resistor and said voltage source connected across said network to develop an adjustable bias voltage therein which permits the collector current to attain said predetermined value when the ambient light intensity is less than said predetermined value and circuit means connected with said network and operative until the engine of the vehicle is started to change the bias voltage and prevent the collector current from attaining said predetermined value.

References Cited in the file of this patent

UNITED STATES PATENTS

| | | |
|---|---|---|
| 1,981,985 | Braselton | Nov. 27, 1934 |
| 2,039,230 | Lamb | Apr. 28, 1936 |
| 2,507,436 | Dole | May 9, 1950 |